US011655731B2

(12) United States Patent
Legare et al.

(10) Patent No.: US 11,655,731 B2
(45) Date of Patent: May 23, 2023

(54) OIL DISTRIBUTION SYSTEM FOR GAS TURBINE ENGINE

(71) Applicant: PRATT & WHITNEY CANADA CORP., Longueuil (CA)

(72) Inventors: Pierre-Yves Legare, Chambly (CA); Sylvain Brouillet, St-Basile-le-Grand (CA); Daniel Alecu, Brampton (CA); Sam Cutrara, Caledon East (CA); Rose Beaulieu, Verdun (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 622 days.

(21) Appl. No.: 16/791,375

(22) Filed: Feb. 14, 2020

(65) Prior Publication Data

US 2021/0254506 A1 Aug. 19, 2021

(51) Int. Cl.
*F01D 25/20* (2006.01)
*F01M 1/02* (2006.01)
*F01M 1/10* (2006.01)
*F01M 11/00* (2006.01)
*F16H 57/04* (2010.01)

(52) U.S. Cl.
CPC .............. *F01D 25/20* (2013.01); *F01M 1/02* (2013.01); *F01M 1/10* (2013.01); *F01M 11/0004* (2013.01); *F16H 57/0402* (2013.01); *F16H 57/0436* (2013.01); *F16H 57/0452* (2013.01); *F16H 57/0457* (2013.01); *F01M 2001/105* (2013.01); *F01M 2001/1035* (2013.01)

(58) Field of Classification Search
CPC . F01D 25/20; F01M 1/02; F01M 1/10; F01M 11/0004; F01M 2001/1035; F01M 2001/105; F16H 57/0402; F16H 57/0436; F16H 57/0452; F16H 57/0457
See application file for complete search history.

(56) References Cited

U.S. PATENT DOCUMENTS

| 4,090,820 | A | 5/1978 | Teruyama |
| 4,480,970 | A | 11/1984 | Smith |
| 4,511,016 | A | 4/1985 | Döëll |
| 4,576,001 | A | 3/1986 | Smith |
| 4,631,009 | A | 12/1986 | Cygnor et al. |
| 4,697,995 | A | 10/1987 | Tuckey |
| 4,756,664 | A | 7/1988 | Cohen et al. |
| 5,004,407 | A | 4/1991 | Hutchison |
| 5,085,561 | A | 2/1992 | Yano et al. |

(Continued)

*Primary Examiner* — Jacob M Amick
(74) *Attorney, Agent, or Firm* — Norton Rose Fulbright Canada LLP

(57) ABSTRACT

An oil supply system for supplying oil to a lubricating cavity of a gas turbine engine, the oil supply system has: a de-oiler having a de-oiler air-oil inlet, a de-oiler oil outlet hydraulically connected to the lubricating cavity, and a de-oiler air outlet in fluid flow communication with an environment outside of the oil supply system; and a closed-loop oil circuit including a main pump having a main pump inlet and a main pump outlet, the main pump outlet hydraulically connected to the lubricating cavity, a de-aerator having a de-aerator inlet hydraulically connected to a scavenge outlet of the lubricating cavity, a de-aerator air-oil outlet in fluid flow communication with the de-oiler inlet, and a de-aerator oil outlet hydraulically connected to the main pump inlet.

19 Claims, 5 Drawing Sheets

(56) References Cited

U.S. PATENT DOCUMENTS

| | | |
|---|---|---|
| 5,584,650 A | 12/1996 | Redmond et al. |
| 7,094,042 B1 | 8/2006 | Borgetti et al. |
| 8,201,664 B2 | 6/2012 | Brouillet et al. |
| 8,245,818 B2 | 8/2012 | Alecu |
| 8,500,869 B1 | 8/2013 | Johnson et al. |
| 8,529,668 B2 | 9/2013 | Short et al. |
| 8,601,785 B2 | 12/2013 | Legare |
| 8,679,238 B2 | 3/2014 | Angst |
| 9,033,690 B2 | 5/2015 | Alecu et al. |
| 9,260,980 B2 | 2/2016 | Leese |
| 9,303,529 B2 | 4/2016 | Schelonka |
| 9,849,411 B2 | 12/2017 | Sheridan |
| 9,964,039 B2 | 5/2018 | Parnin et al. |
| 10,060,290 B2 | 8/2018 | Moniz et al. |
| 10,393,313 B2 | 8/2019 | Beier et al. |
| 10,436,066 B2 | 10/2019 | Belfield |
| 2007/0178003 A1 | 8/2007 | Zhu et al. |
| 2009/0101444 A1 | 4/2009 | Alecu |
| 2010/0065374 A1* | 3/2010 | Szolomayer ......... F01M 11/067 700/282 |
| 2018/0119617 A1 | 5/2018 | Pulter et al. |

\* cited by examiner

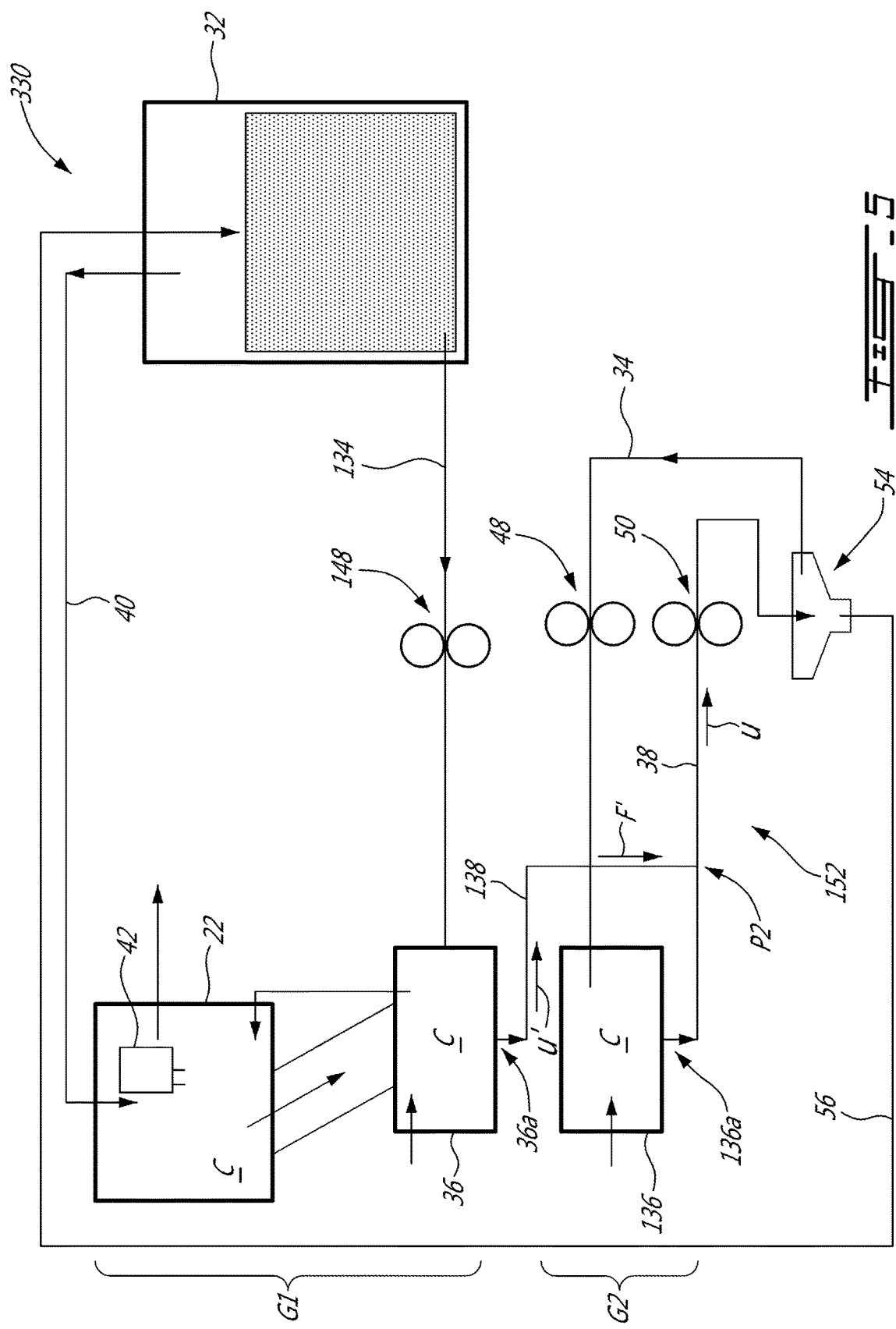

OIL DISTRIBUTION SYSTEM FOR GAS TURBINE ENGINE

TECHNICAL FIELD

The application relates generally to gas turbine engines and, more particularly, to lubrication system used in such engines.

BACKGROUND

Some components of a gas turbine engine require oil for lubricating and/or cooling such components. In some cases, the oil that has been used for lubricating and/or cooling is directed toward a tank to remove air from the oil. While suitable for their intended purposes, improvement of such systems is however sought, particularly with respect to their ability to remove air from the oil.

SUMMARY

In one aspect, there is provided an oil supply system for supplying oil to a lubricating cavity of a gas turbine engine, the oil supply system comprising: a de-oiler having a de-oiler air-oil inlet, a de-oiler oil outlet hydraulically connected to the lubricating cavity, and a de-oiler air outlet in fluid flow communication with an environment outside of the oil supply system; and a closed-loop oil circuit including a main pump having a main pump inlet and a main pump outlet, the main pump outlet hydraulically connected to the lubricating cavity, a de-aerator having a de-aerator inlet hydraulically connected to a scavenge outlet of the lubricating cavity, a de-aerator air-oil outlet in fluid flow communication with the de-oiler inlet, and a de-aerator oil outlet hydraulically connected to the main pump inlet.

In another aspect, there is provided an oil supply system for supplying oil to a lubricating cavity of a gas turbine engine, the oil supply system comprising: a de-oiler having a de-oiler air-oil inlet, a de-oiler oil outlet hydraulically connected to the lubricating cavity, and a de-oiler air outlet in fluid flow communication with an environment outside of the oil supply system; and a closed-loop oil circuit including a de-aerator having a de-aerator inlet hydraulically connected to a scavenge outlet of the lubricating cavity via a scavenge line, an oil outlet hydraulically connected to the lubricating cavity via a main line, and a de-aerator air-oil outlet in fluid flow communication with the de-oiler air-oil inlet.

In yet another aspect, there is provided a method removing air from the oil in an oil supply system of a gas turbine engine, comprising: feeding oil to a lubricating cavity; scavenging the oil from the lubricating cavity and removing air from the scavenged oil by centrifugation; removing oil from a flow of air resulting from the centrifugation and expelling the removed air to an environment outside the oil supply system; and returning the centrifuged oil back to the lubricating cavity.

BRIEF DESCRIPTION OF THE DRAWINGS

Reference is now made to the accompanying figures in which:

FIG. 5 is a schematic view of an alternate implementation of a closed-loop oil circuit of the oil supply system of FIG. 3.

DETAILED DESCRIPTION

Figure 1:
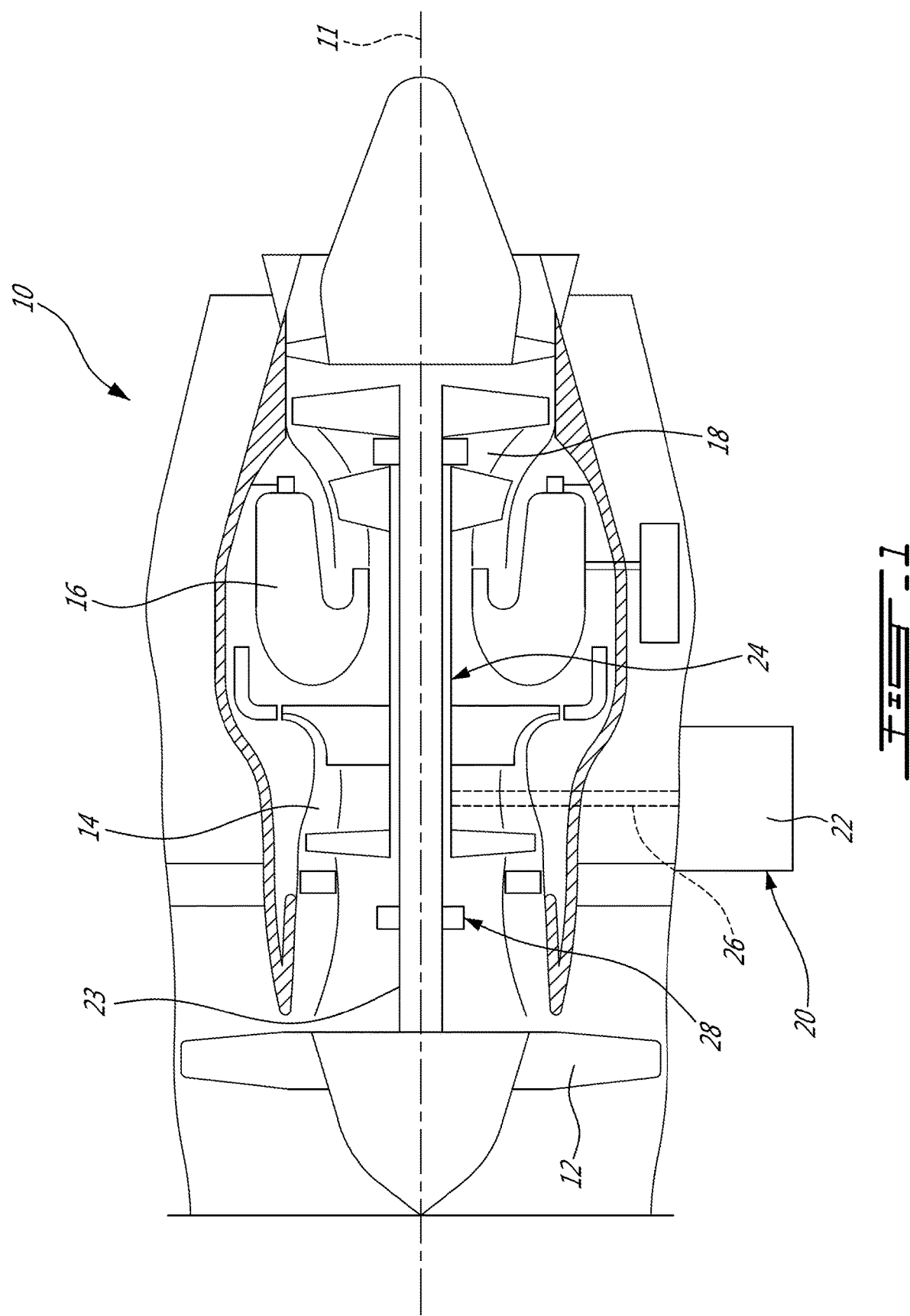
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the engine 10.

The fan 12 is drivingly interconnected to low pressure rotor(s) of the turbine section 18 through a low pressure shaft 23, and the high pressure rotor(s) of the compressor section 14 is/are drivingly connected to high pressure rotor(s) of the turbine section 18 through a high pressure shaft 24 concentrically surrounding the low pressure shaft 23.

The gas turbine engine 10 may include an accessory drive assembly 20 which includes an accessory gearbox (AGB) 22. Although not shown, the accessory drive assembly 20 can also include a pump assembly and/or a starter generator. The accessory drive assembly 20 may be driven by the high pressure shaft 24 via an accessory shaft 26 which drivingly interconnects the high pressure shaft 24 and the accessory gearbox 22. Bearings 28 may be used to rotatably support different components of the engine 10, such as the high- or low-pressure shafts 24, 23 and components of the AGB 22. Those bearings 28 may be located within bearing cavities, which may be connected to a source of lubricant for cooling and lubricating the bearings. In some cases, the bearing cavities are connected to a source of compressed air, such as a stage of the compressor section 16, for maintaining a pressure outside the bearing cavities greater than that inside them to limit leakage of lubricant. In the description below, the terms "lubricant" and "oil" are used interchangeably.

Figure 2:
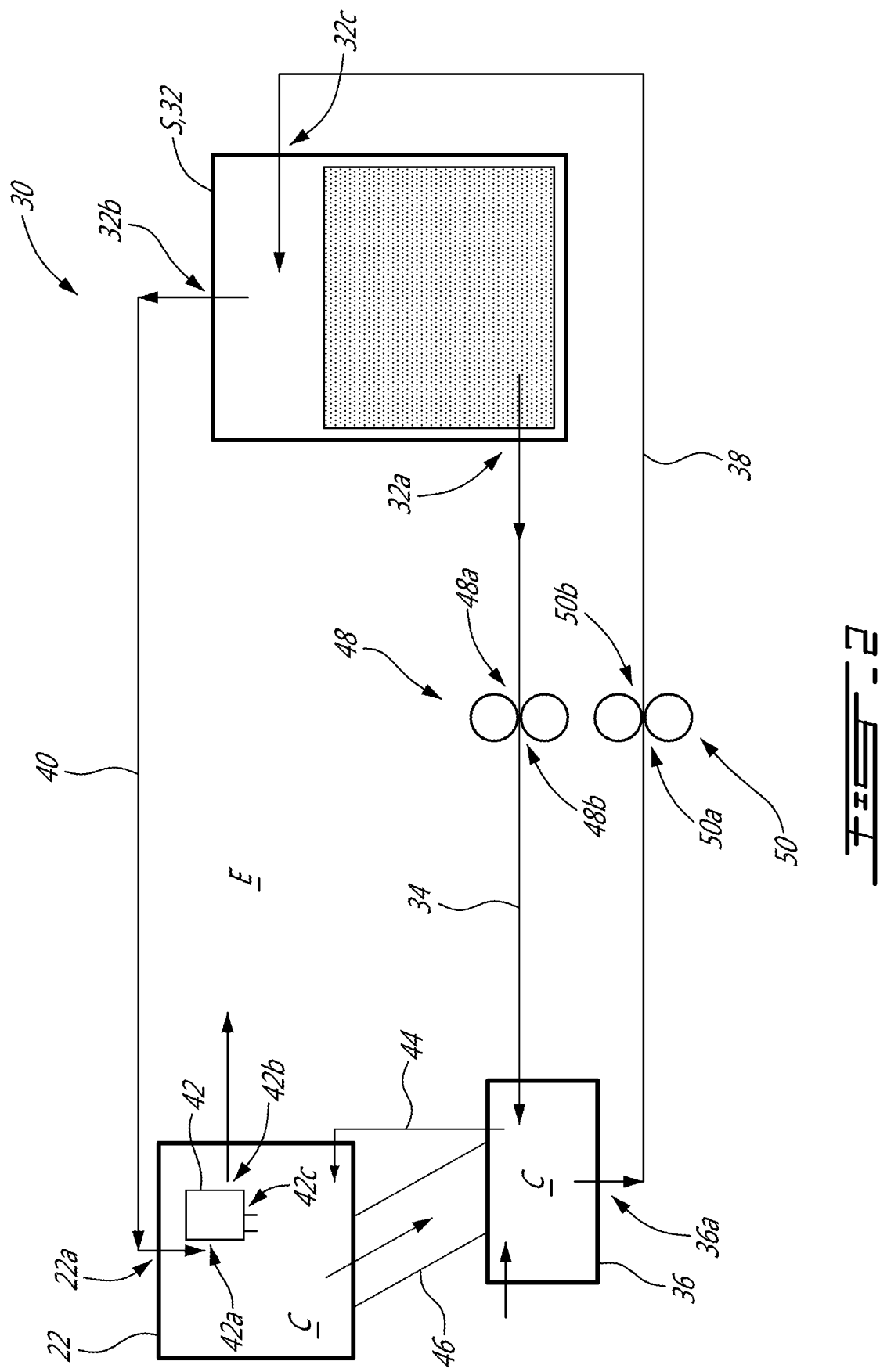
FIG. 2 is a schematic view of an oil supply system in accordance with one embodiment which can be used in a gas turbine engine such as shown in FIG. 1.

Referring now to FIG. 2, an oil supply system is shown generally at 30. The system 30 includes a source of oil S, which in this case is an oil tank 32. The system 30 further includes a main line 34 hydraulically connected to an outlet 32a of the oil tank 32 and to at least one lubricating cavity C, which may include the AGB 22 and one or more bearing cavities 36 containing some of the bearings 28 (FIG. 1). The system 30 further includes a scavenge line 38 hydraulically connected to a scavenge outlet 36a of the bearing cavity(ies) 36 and to the oil tank 32 for returning scavenged oil back to the oil tank where a de-aeration process may naturally undergo.

A vent line 40 hydraulically connects an air outlet 32b of the oil tank 32 to an air inlet 22a of the AGB 22. A de-oiler 42 may be located within the cavity C of the AGB 22. The de-oiler 42 may have an air-oil inlet 42a for receiving an air-oil mixture and an air outlet 42b for expelling air. The air-oil mixture received within the de-oiler 42 via its inlet 42a may be composed mainly of air. The oil contained within this mixture may in part provide from the oil contained within the cavity C that is jetted therein and that splashes upon impact with rotating gear(s) of the AGB 22. The de-oiler 42 may have an oil outlet 42c for outputting oil extracted from the air-oil mixture. The de-oiler 42 may remove a remainder of oil contained within the air-oil mixture flowing within the vent line 40 and may expel the air to an environment E outside the system 30. The extracted oil may exit the de-oiler 42 via the oil outlet 42c and may be used for lubrication. The oil exits the de-oiler 42 via the oil outlet 42c and may lubricate components of the AGB 22 and/or the bearings 28 contained in the bearing cavities 36. The substantially de-oiled air may exit the de-oiler 42 via its air outlet 42b and be expelled to the environment E. The de-oiler 42 may include a porous medium (e.g., sponge) through which an air-oil mixture is injected for agglomerating oil droplets into bigger droplets.

In the embodiment shown, the oil is injected first into the bearing cavity 36 and directed to the AGB 22 via a line 44. Once the oil has lubricated the components of the AGB 22, the oil may circulate by gravity or other means toward the bearing cavity 36 via one or more conduits 46. Other configurations are contemplated without departing from the scope of the present disclosure. For instance, the oil may lubricate the bearings 28 (FIG. 1) in the bearing cavities 36 before being directed to the AGB 22 for lubrication thereof.

In the embodiment shown, a main pump 48 and a scavenge pump 50 are used to drive a flow of oil in the main line 34 and scavenge line 38, respectively. In other words, the main pump 48 is hydraulically connected on the main line 34 and the scavenge pump 50 is hydraulically connected on the scavenge line 38. The main pump 48 has a main pump inlet 48a hydraulically connected to the outlet 32a of the oil tank 32 and a main pump outlet 48b hydraulically connected to the lubricating cavities C. The scavenge pump 50 has a scavenge pump inlet 50a hydraulically connected to the scavenge outlet 36a of the cavities C and a scavenge pump outlet 50b hydraulically connected to the oil tank 32 via inlet 32c thereof. Other configurations are contemplated without departing from the scope of the present disclosure. For instance, the oil may be scavenged with separate scavenge pumps and/or by blow down.

Typically, in the above described oil system 30, the scavenged oil mixture sent back to the oil tank 32 separates from the air it contains in an almost stagnant environment. This separation may require a residence time of the scavenged oil in the tank. This may be undesired.

Figure 3:
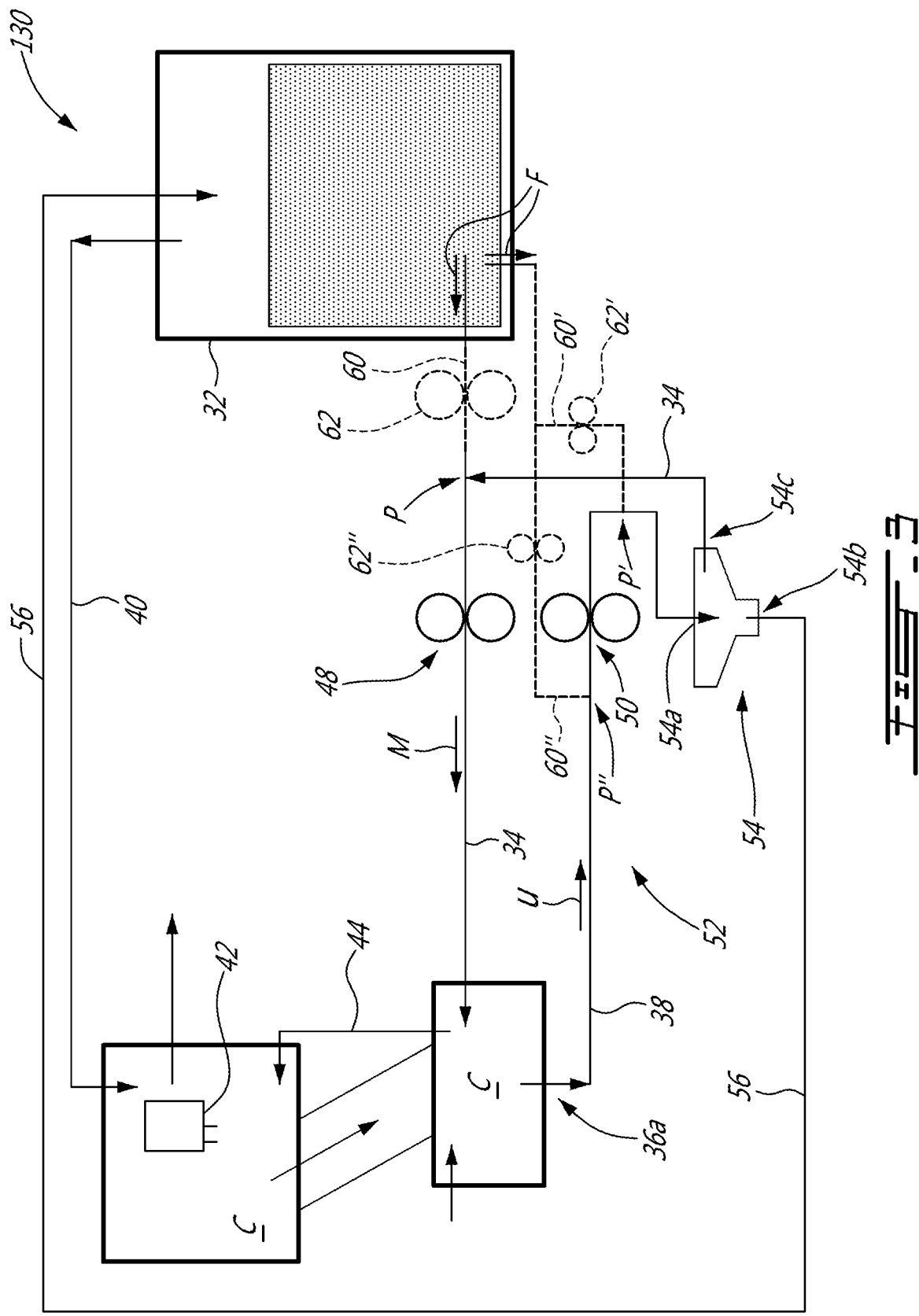
FIG. 3 is a schematic view of an oil supply system in accordance with another embodiment.

Referring now to FIG. 3, another embodiment of an oil system is shown generally at 130. The oil system 130 includes a closed-loop oil circuit 52 in which oil may circulate in loop to and from the cavities C. The system 130 includes a de-aerator 54 for separating the air from the scavenged oil. In other words, contrary to the oil system 30 described above with reference to FIG. 2, the scavenged oil is de-aerated via its passage into the de-aerator 54 and returned to the cavities C thereby bypassing the oil tank 32.

The de-aerator 54 has an air-oil inlet 54a, air-oil outlet 54b and an oil outlet 54c. The air-oil inlet 54a is hydraulically connected to the scavenge outlet 36a of the cavity C via the scavenge line 38; the air-oil outlet 54b is hydraulically connected to the oil tank 32 via a return line 56; and the oil outlet 54c is hydraulically connected to the cavities C via the main line 34. As shown in FIG. 3, the return line 56 is hydraulically connected to the de-oiler 42 via the vent line 40. The de-aerator 54 is used to remove the air from a first air-oil mixture it receives via the air-oil inlet 54a. In some cases, however, the de-aerator is unable to extract an entirety of the oil from the received first air-oil mixture. In such a case, a second air-oil mixture is outputted from the de-aerator 54 via the air-oil outlet 54b and is directed toward the tank 32 where air and oil of the second air-oil mixture may separate. It will be appreciated that an oil concentration of the first air-oil mixture may be greater than that of the second air-oil mixture. The disclosed de-aerator has solely two outlets: the oil outlet 54c and the air-oil outlet 54b. The de-aerator 54 may have solely three connections to the oil system, that is the air-oil inlet 54a, the air-oil outlet 54b, and the oil outlet 54c, and may be free of other connections to the oil system.

The de-aerator may be an "active" de-aerator, such as a centrifugal deaerator which has at least one component (such as a rotor, for example), which is driven, such as by electrical and/or pneumatic and/or hydraulic or other means (motors, actuators, etc.). An example of such an active de-aerator is described in U.S. Pat. No. 8,601,785, the entire content of which is incorporated herein by reference. Herein, an active de-aerator may be an assembly including a rotor, and defining an inlet, an oil outlet, and an air outlet; the inlet, the oil outlet, and the air outlet being static relative to the rotor. An active de-aerator may rely on centrifugal force for separating the oil from the air. The de-aerator 54 may differ from the de-oiler 42 as it may not include a porous medium. A cross-section of the rotor may ensure that a positive pressure differential is maintained between the air outlet and the oil outlet; the oil outlet being at a higher pressure tan the air outlet. In some cases, "passive" de-aerator, that is, a de-aerator that do not include a moving part (e.g., the rotor), may be used. Such a passive de-aerator may use a swirl pot. For instance, such a passive de-aerator may include a spiral tube in which the flow is forced into by the scavenge pump(s). The spiral tube may separate the oil and the air using a centrifugal effect.

The de-oiler 42 is designed to remove a small quantity of oil (e.g., oil droplets/mist) remaining in an air flow injected therein via the vent line 40. This is different than the de-aerator 54 that is designed to remove a small quantity of air from an oil mixture. In other words, the de-oiler 42 may remove a small quantity of oil remaining within a mixture composed mainly of air before expelling said air to the environment E. The de-aerator 54 may remove a small quantity of air remaining within a mixture composed mainly of oil before distributing said oil to the lubricating cavities.

In some cases, the oil circulating within the closed-loop oil circuit 52 may be consumed (e.g., burned, leaked, and so on) such that more oil may need to be added to the closed-loop oil circuit 52. In the embodiment show, the system 130 further includes a make-up line 60; a plurality of available positions of the make-up line 60 are shown in dashed lines in FIG. 3 and are referred to herein below as 60, 60', 60". Those positions are described herein below. In each cases, the make-up lines 60, 60', 60" may have an inlet hydraulically connected to the oil tank 32 for receiving a make-up flow of oil denoted by arrow F.

In a first possibility, the make-up line 60 is hydraulically connected to the main line 34 at a connection point P located between the de-aerator 54 and the main pump 48. Stated differently, the make-up line 60 may be connected downstream of the de-aerator 54 and upstream of the main pump 48 relative to a main flow of oil circulating within the main line 34 and denoted by arrow M. In a second possibility, the make-up line 60' is hydraulically connected to the scavenge line 38 at a connection point P' located between the scavenge pump 50 and the de-aerator 54. Stated differently, the make-up line 60' may be connected upstream of the de-aerator 54 and downstream of the scavenge pump 50 relative to a scavenge flow of oil denoted by arrow U. In a third possibility, the make-up line 60" is hydraulically connected to the scavenge line 38 at a connection point P'" located between the scavenge outlet 36a of the cavity 36 and the scavenge pump 50. Stated differently, the make-up line 60" may be connected upstream of the scavenge pump 50 and downstream of the scavenge outlet 36a relative to the scavenge flow U. It is understood that other possibilities are contemplated without departing from the scope of the present disclosure.

For each of the above described possible connections of the make-up line 60, 60', 60", a make-up pump 62, 62', 62" may be hydraulically connected on the make-up line 60, 60', 60" to induce a flow from the oil tank 32 towards the connection points P, P', P" described above. The make-up pump may be avoided in some configurations.

Figure 4:
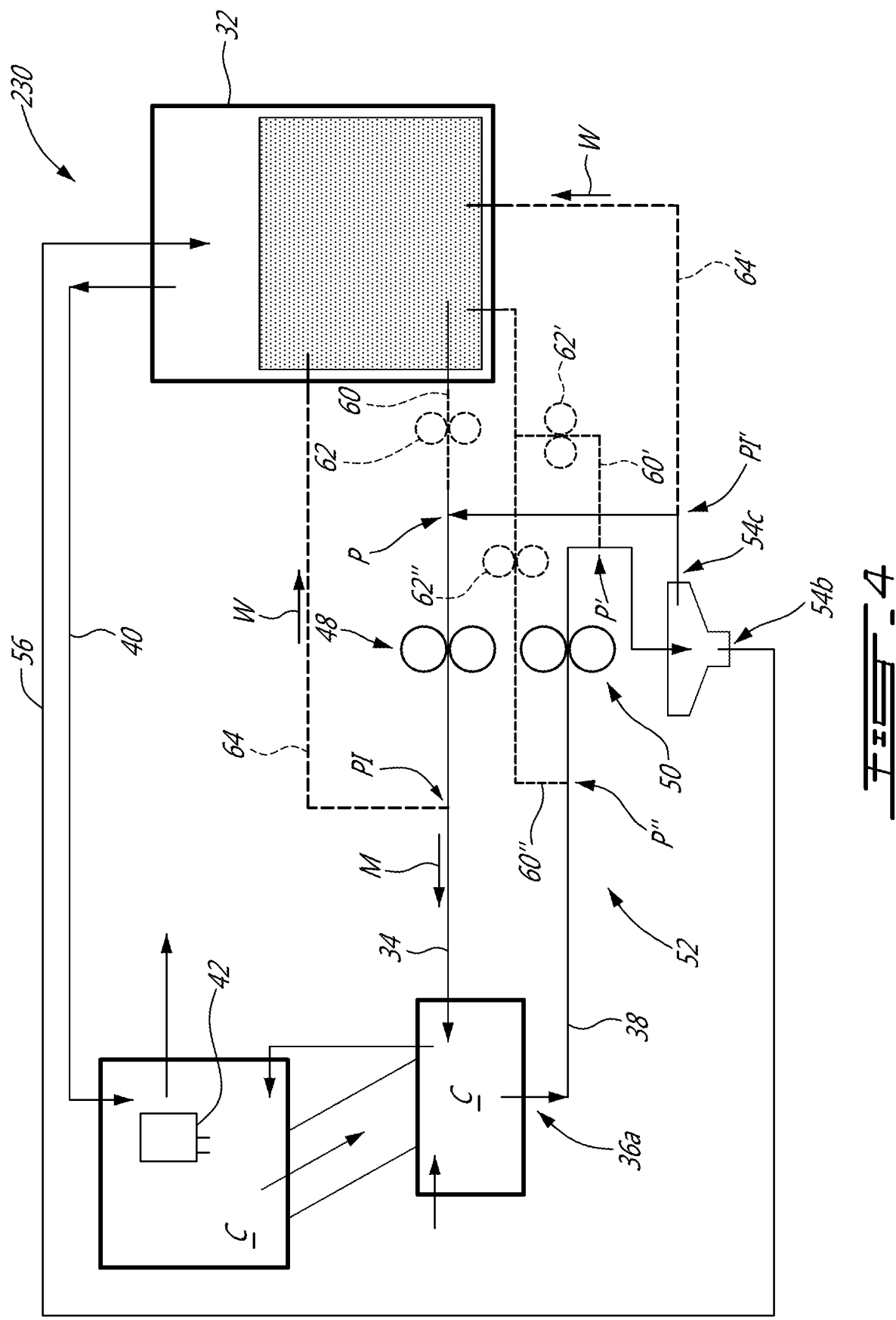
FIG. 4 is a schematic view of the oil supply system of FIG. 3, with additional features shown.

Referring now to FIG. 4, another embodiment of an oil system is shown generally at 230. In some cases, a flow of oil returning back to the tank 32 via the air-oil outlet 54b of the de-aerator 54 and the return line 56 hydraulically connected thereto may be insufficient to maintain a minimum temperature within the tank 32. In these cases, a warm-up flow, denoted by arrow W, on FIG. 4, may be drawn from the closed-loop oil circuit 52 and directed toward the tank 32. The warm-up flow W may be drawn from a plurality of locations from the closed-loop oil circuit 52. FIG. 4 illustrates two possibilities. However, it is understood that the warm-up flow may be drawn from any of the main line 34, scavenge line 38, de-aerator oil line, and so on.

For drawing the warm-up flow W, a warm-up line 64 may be hydraulically connected to the main line 34 at a connection point P1 located downstream of the main pump 48 relative to the main flow M and upstream of the cavities C. Alternatively, the connection point P1 may be located upstream of the main pump 48 and downstream of the connection point P between the make-up line 60 and the closed-loop oil circuit 52. Alternatively, the warm-up line 64' may be hydraulically connected to the main line 34 downstream of the de-aerator 54 and upstream of the main pump 48 relative to the main flow M. More specifically, a connection point P1' between the make-up line 64' and the main line 34 may be located upstream of the connection point P between the make-up line 60 and the closed-loop oil circuit 52. Any other suitable location for the connection point P1 between the warm-up line 64 and the closed-loop oil circuit 52 are contemplated without departing from the scope of the present disclosure.

Referring now to FIG. 5, another embodiment of an oil system is shown generally at 330. In the embodiment shown, the lubricating cavities C may be divided in groups of lubricating cavities. The closed-loop oil circuit 152 may include only the cavities of one of the groups. More specifically, and in the embodiment shown, first and second groups G1, G2, of lubricating cavities are present. The first group G1 of cavities C may include the AGB 22 and one or more bearing cavity(ies) 36. The second group G2 of cavities C may include one or more second bearing cavity(ies) 136. Herein, the closed-loop oil circuit 152 includes only the cavities C of the second group G2, herein the second bearing cavity 136.

In the embodiment shown, the oil is injected into the second bearing cavity 136 via the main line 34, the oil is scavenged via the scavenge line 38 and directed through the de-aerator 54 where the oil is extracted from the first air-oil mixture (e.g., scavenged oil). The oil is re-directed to the second bearing cavity 136 via the main line 34 and the second air-oil mixture is directed to the tank 32 via the return line 56.

In the present embodiment, the cavities C of the first group G1 are fed in oil directly from the tank 32 via a second main line 134, which may include a second main pump 148 hydraulically connected thereon. The oil injected into the cavities C of the second group G2 may exit those cavities C via the scavenge outlet 36a and may be combined with the oil exiting the second bearing cavity 136 via a second scavenge outlet 136a and flown to the de-aerator via the scavenge line 38. In other words, a secondary scavenge line 138 may hydraulically connect the scavenge outlet 36a of the cavities of the first group G1 to the scavenge line 38 of the closed-loop oil circuit 152 at a connection point P2 on the scavenge line 38 downstream of the secondary scavenge outlet 136a and upstream of the de-aerator 54 relative to the scavenge flow U. In a particular embodiment, the oil from different cavities may be scavenged with separate scavenge pumps having outlets hydraulically connected to the de-aerator. Alternatively, the oil from the cavity 36 can be transferred to the cavity 136 and both flow may be scavenged by the same scavenge pump. In the embodiment shown, a make-up flow F' is created by the scavenged oil exiting the cavities C of the first group G1 of cavities C. The make-up flow F' therefore provides from the oil of the first group G1 of cavities C and is injected into the closed-loop oil circuit 152 in the scavenge line 38. Two scavenge flows U, U' are de-aerated via their passage through the same de-aerator 54. Although not shown in FIG. 5, a warm-up flow line and/or a make-up flow line may be added to the system 330 as described herein above with reference to FIGS. 3-4.

The incorporation of a de-aerator 54, which may be a centrifugal air/oil separator, downstream of the scavenge lines 38 may allow to separate the oil mixture before sending it to other locations. It may reduce the residence time in the tank 32. The active de-aerator 54 benefits may vary with its performance to remove the air from the oil and its location in the oil systems 130, 230, 330.

The magnitude of the benefits may vary with the following factors: the quantity of oil scavenged from the cavities C in extreme conditions; the location of the hardware on the engine (impacting the oil lines and the weight comparison); MOP range requirements. Thus, it will be appreciated that different engines may have different preferred options.

In a particular embodiment, the disclosed oil systems 130, 230, 330, allows for reduction of the residence time of the oil in the tank 32; minimization of the air/mist quantity that requires residence time prior use. Solid oil returned may requires almost no residence time to be used. The disclosed systems 130, 230, 330 may allow for steady-state and transient stability. That is, the systems may impact the pressure balance across the de-aerator 54 and the stability in steady-state and transient. The disclosed systems may allow for the de-aeration of the make-up flow. In other words, the disclosed systems 130, 230, 330 may allow de-aeration of the oil from the tank 32 if only foam remains in the tank 32. The make-up pump 62 may ensure a constant make-up flow for a given pump speed compared to a configuration without the make-up pump 62 in which the make-up flow may vary with the pressure balance. The disclosed systems 130, 230, 330 may maintain main oil pressure in negative. That is, the de-aerator 54 may provide the available scavenged oil to the pressure pump and may ensure that a minimum main oil pressure is maintained in negative G. The disclosed systems 130, 230, 330 may allow the prioritization of the flow to some cavities C in negative G. That is, the de-aerator 54 may provide the available scavenged oil flow in negative G to hardware not tolerant to a temporary lack of lubrication. These may correspond to the cavities C of the second group G2. The disclosed systems 130, 230, 330 may allow for an oil consumption reduction. This may depend on the performance of the de-aerator 54. The air exiting the active de-aerator 54 may contain more or less oil mist. The active de-aeration may lead to less oil mist in the air of the tank 32 than the system 30 of FIG. 2. The air vented to the AGB 22 and exiting the AGB 22 may contain less oil and may lead to a reduced oil consumption.

For removing air from the oil in the oil supply system: the oil is fed to a lubricating cavity C; the oil is scavenged from the lubricating cavity C and air is removed from the scavenged oil by centrifugation; oil from a flow of air resulting from the centrifugation is removed and the removed air is expelled to the environment E outside the oil supply system; and the centrifuged oil is returned back to the lubricating cavity. In some cases, oil from a source of oil may be added either upstream of a location where the air is removed from the scavenged oil or downstream of the location.

Embodiments disclosed herein include:

A. An oil supply system for supplying oil to a lubricating cavity of a gas turbine engine, the oil supply system comprising: a de-oiler having a de-oiler air-oil inlet, a de-oiler oil outlet hydraulically connected to the lubricating cavity, and a de-oiler air outlet in fluid flow communication with an environment outside of the oil supply system; and a closed-loop oil circuit including a main pump having a main pump inlet and a main pump outlet, the main pump outlet hydraulically connected to the lubricating cavity, a de-aerator having a de-aerator inlet hydraulically connected to a scavenge outlet of the lubricating cavity, a de-aerator air-oil outlet in fluid flow communication with the de-oiler inlet, and a de-aerator oil outlet hydraulically connected to the main pump inlet.

B. An oil supply system for supplying oil to a lubricating cavity of a gas turbine engine, the oil supply system comprising: a de-oiler having a de-oiler air-oil inlet, a de-oiler oil outlet hydraulically connected to the lubricating cavity, and a de-oiler air outlet in fluid flow communication with an environment outside of the oil supply system; and a closed-loop oil circuit including a de-aerator having a de-aerator inlet hydraulically connected to a scavenge outlet of the lubricating cavity via a scavenge line, an oil outlet hydraulically connected to the lubricating cavity via a main line, and a de-aerator air-oil outlet in fluid flow communication with the de-oiler air-oil inlet.

Embodiments A and B may include any of the following elements, in any combinations:

Element 1: the de-aerator is an active de-aerator. Element 2: the closed-loop oil circuit is hydraulically connected to a source of oil for supplementing oil into the closed-loop oil circuit. Element 3: the source of oil is hydraulically connected to the closed-loop oil circuit upstream of the lubricating cavity and downstream of the de-aerator oil outlet and upstream of the main pump. Element 4: a scavenge pump is hydraulically connected to the closed-loop oil circuit downstream of the lubricating cavity and upstream of the de-aerator inlet, the source of oil hydraulically connected to the closed-loop oil circuit either upstream or downstream of the scavenge pump and between the lubricating cavity and the de-aerator. Element 5: the lubricating cavity is part of a first group of lubricating cavities, the source of oil is hydraulically connected to the closed-loop oil circuit via one or more lubricating cavities of a second group of lubricating cavities. Element 6: the one or more lubricating cavities of the second group of lubricating cavities have a scavenge oil outlet hydraulically connected to the closed-loop oil circuit between the de-aerator and the lubricating cavity of the first group of lubricating cavities. Element 7: the lubricating cavity includes a cavity of an accessory gearbox and a bearing cavity, the de-oiler located in the cavity of the accessory gearbox. Element 8: the closed-loop oil circuit is hydraulically connected to the source of oil via a make-up flow line, the oil supply system further comprising a warm-up flow line hydraulically connecting the source of oil to the closed-loop oil circuit for drawing a flow of oil from the closed-loop oil circuit to the source of oil. Element 9: the de-aerator is a centrifugal de-aerator. Element 10: the source of oil is an oil tank, the de-aerator air-oil outlet in communication with the de-oiler inlet via the oil tank. Element 11: the de-aerator oil outlet is hydraulically connected to the lubricating cavity via the main pump and bypasses the source of oil. Element 12: the de-aerator is a centrifugal de-aerator. Element 13: the source of oil is hydraulically connected to the closed-loop oil circuit upstream of the lubricating cavity and downstream of the de-aerator oil outlet. Element 14: the closed-loop oil circuit is hydraulically connected to a source of oil for supplementing oil into the closed-loop oil circuit. Element 15: the source of oil is an oil tank, the de-aerator air outlet in communication with the de-oiler inlet via the oil tank. Element 16: the de-aerator oil outlet is hydraulically connected to the lubricating cavity and bypasses the source of oil.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the return line 56 of the de-aerator 54 may be routed at different locations, that is, it may be routed to the AGB 22 instead of the tank 32. The tank 32 could be vented via the AGB 22. Depending of the amount of excess oil in the return line 56, a static de-aerator may be added in the tank 32 to separate the excess oil from the air in the return line 56 before directing the air to the AGB 22. A tank pressurizing valve may be added to ensure a minimum pressure in the tank 32. The make-up pump 62 may be replaced with ejectors or other pumping features. Restrictors and oil cooler may be added in the systems 130, 230, 330 and they may ensure pressure and temperature balance. Yet further modifications could be implemented by a person of ordinary skill in the art in view of the present disclosure, which modifications would be within the scope of the present technology.

The invention claimed is:

1. An oil supply system for supplying oil to a lubricating cavity of a gas turbine engine from a source of oil, the oil supply system comprising: a de-oiler having a de-oiler air-oil inlet, a de-oiler oil outlet hydraulically connected to the lubricating cavity, and a de-oiler air outlet in fluid flow communication with an environment outside of the oil supply system; and a closed-loop oil circuit including a main pump having a main pump inlet and a main pump outlet, the main pump outlet hydraulically connected to the lubricating cavity, a de-aerator having a de-aerator inlet hydraulically connected to a scavenge outlet of the lubricating cavity, a de-aerator air-oil outlet in fluid flow communication with the de-oiler inlet, and a de-aerator oil outlet hydraulically connected to the main pump inlet, the de-aerator oil outlet being hydraulically connected to the lubricating cavity via the main pump and bypasses the source of oil.

2. The oil supply system of claim 1, wherein the de-aerator is an active de-aerator.

3. The oil supply system of claim 1, wherein the closed-loop oil circuit is hydraulically connected to a source of oil for supplementing oil into the closed-loop oil circuit.

4. The oil supply system of claim 3, wherein the source of oil is hydraulically connected to the closed-loop oil circuit upstream of the lubricating cavity and downstream of the de-aerator oil outlet and upstream of the main pump.

5. The oil supply system of claim 3, wherein a scavenge pump is hydraulically connected to the closed-loop oil circuit downstream of the lubricating cavity and upstream of the de-aerator inlet, the source of oil hydraulically connected to the closed-loop oil circuit either upstream or downstream of the scavenge pump and between the lubricating cavity and the de-aerator.

6. The oil supply system of claim 3, wherein the lubricating cavity is part of a first group of lubricating cavities, the source of oil is hydraulically connected to the closed-loop oil circuit via one or more lubricating cavities of a second group of lubricating cavities.

7. The oil supply system of claim 6, wherein the one or more lubricating cavities of the second group of lubricating cavities have a scavenge oil outlet hydraulically connected to the closed-loop oil circuit between the de-aerator and the lubricating cavity of the first group of lubricating cavities.

8. The oil supply system of claim 1, wherein the lubricating cavity includes a cavity of an accessory gearbox and a bearing cavity, the de-oiler located in the cavity of the accessory gearbox.

9. The oil supply system of claim 3, wherein the closed-loop oil circuit is hydraulically connected to the source of oil via a make-up flow line, the oil supply system further comprising a warm-up flow line hydraulically connecting the source of oil to the closed-loop oil circuit for drawing a flow of oil from the closed-loop oil circuit to the source of oil.

10. The oil supply system of claim 2, wherein the de-aerator is a centrifugal de-aerator.

11. The oil supply system of claim 3, wherein the source of oil is an oil tank, the de-aerator air-oil outlet in communication with the de-oiler inlet via the oil tank.

12. An oil supply system for supplying oil to a lubricating cavity of a gas turbine engine, the oil supply system comprising: a de-oiler having a de-oiler air-oil inlet, a de-oiler oil outlet hydraulically connected to the lubricating cavity, and a de-oiler air outlet in fluid flow communication with an environment outside of the oil supply system; and a closed-loop oil circuit including a de-aerator having a de-aerator inlet hydraulically connected to a scavenge outlet of the lubricating cavity via a scavenge line, an oil outlet hydraulically connected to the lubricating cavity via a main line, and a de-aerator air-oil outlet in fluid flow communication with the de-oiler air-oil inlet, the lubricating cavity includes a cavity of an accessory gearbox and a bearing cavity, the de-oiler located in the cavity of the accessory gearbox.

13. The oil supply system of claim 12, wherein the de-aerator is a centrifugal de-aerator.

14. The oil supply system of claim 12, wherein the source of oil is hydraulically connected to the closed-loop oil circuit upstream of the lubricating cavity and downstream of the de-aerator oil outlet.

15. The oil supply system of claim 12 wherein the closed-loop oil circuit is hydraulically connected to a source of oil for supplementing oil into the closed-loop oil circuit.

16. The oil supply system of claim 15, wherein the source of oil is an oil tank, the de-aerator air outlet in communication with the de-oiler inlet via the oil tank.

17. The oil supply system of claim 15, wherein the de-aerator oil outlet is hydraulically connected to the lubricating cavity and bypasses the source of oil.

18. A method of removing air from the oil in an oil supply system of a gas turbine engine, comprising:
feeding oil to a lubricating cavity;
scavenging the oil from the lubricating cavity and removing air from the scavenged oil by centrifugation;
removing oil from a flow of air resulting from the centrifugation and expelling the removed air to an environment outside the oil supply system; and
returning the centrifuged oil back to the lubricating cavity while bypassing a source of oil.

19. The method of claim 18, further comprising adding oil from the source of oil either upstream of a location where the air is removed from the scavenged oil or downstream of the location.

* * * * *